(12) United States Patent
Moulsley et al.

(10) Patent No.: US 8,923,775 B2
(45) Date of Patent: Dec. 30, 2014

(54) METHOD FOR COMMUNICATING IN A NETWORK AND RADIO STATIONS THEREFOR

(75) Inventors: Timothy J. Moulsley, Caterham (GB); Milos Tesanovic, Cambridge (GB); Matthew P.J. Baker, Canterbury (GB); Paul Bucknell, Brighton (GB)

(73) Assignee: Koninklijke Philips N.V., Eindhoven (NL)

( * ) Notice: Subject to any disclaimer, the term of this patent is extended or adjusted under 35 U.S.C. 154(b) by 623 days.

(21) Appl. No.: 12/989,658

(22) PCT Filed: Apr. 22, 2009

(86) PCT No.: PCT/IB2009/051644
§ 371 (c)(1),
(2), (4) Date: Oct. 26, 2010

(87) PCT Pub. No.: WO2009/133493
PCT Pub. Date: Nov. 5, 2009

(65) Prior Publication Data
US 2011/0039500 A1     Feb. 17, 2011

(30) Foreign Application Priority Data
Apr. 30, 2008    (EP) ..................... 08305143

(51) Int. Cl.
*H04B 17/00* (2006.01)
*H04W 48/00* (2009.01)
*H04L 1/00* (2006.01)

(52) U.S. Cl.
CPC ............. *H04L 1/0026* (2013.01); *H04W 48/00* (2013.01); *H04L 1/0029* (2013.01); *H04L 1/0027* (2013.01)
USPC ........ 455/67.13; 370/329; 370/338; 370/341; 370/352

(58) Field of Classification Search
CPC ... H04W 72/04; H04W 24/10; H04W 72/044; H04W 72/005; H04W 74/0816; H04W 72/087; H04W 72/08; H04W 74/06
USPC .................. 455/67.13, 63.1, 67.11, 450, 509, 455/456.2; 370/329, 348, 341, 346
See application file for complete search history.

(56) References Cited

U.S. PATENT DOCUMENTS 5,872,522 A * 2/1999 Gibson ..................... 340/10.2
7,778,151 B2 * 8/2010 Bertrand et al. ............. 370/208

(Continued)

FOREIGN PATENT DOCUMENTS

| JP | 2005094750 A | 4/2005 |
| JP | 2007043697 A | 2/2007 |
| WO | 2007091811 A1 | 8/2007 |

OTHER PUBLICATIONS

Motorola: "Random Access Procedure"; 3GPP RAN1 LTE, R1-061708, Cannes, France, May 8-12, 2006, 2 Page Document.

(Continued)

*Primary Examiner* — Marceau Milord

(57) ABSTRACT

The present invention relates to a method for communicating between a primary station and at least one secondary station, comprising the steps of (a) at the primary station, requesting the secondary station to transmit channel quality information representative of the channel quality and, (b) at the secondary station, responsive to the request of step (a), transmitting to the primary station the channel quality information, wherein step (b) comprises sub-step (b1) wherein the secondary station further transmits with the channel quality information an indication of a secondary station buffer status.

10 Claims, 1 Drawing Sheet

(56) References Cited

U.S. PATENT DOCUMENTS

| | | | |
|---|---|---|---|
| 7,986,673 B2* | 7/2011 | Khoshnevis et al. | 370/332 |
| 8,068,466 B2* | 11/2011 | Muharemovic et al. | 370/335 |
| 8,121,045 B2* | 2/2012 | Cai et al. | 370/252 |
| 8,181,079 B2* | 5/2012 | Gorokhov et al. | 714/748 |
| 8,249,004 B2* | 8/2012 | Wang et al. | 370/329 |
| 8,311,593 B2* | 11/2012 | Harris et al. | 455/574 |
| 8,369,860 B2* | 2/2013 | Zhang et al. | 455/450 |
| 8,427,988 B2* | 4/2013 | Pelletier et al. | 370/311 |
| 2005/0083943 A1 | 4/2005 | Lee et al. | |
| 2007/0026808 A1 | 2/2007 | Love et al. | |
| 2007/0133458 A1 | 6/2007 | Chandra et al. | |
| 2007/0149249 A1* | 6/2007 | Chen et al. | 455/561 |
| 2008/0063116 A1* | 3/2008 | Yokoyama | 375/299 |
| 2009/0046573 A1* | 2/2009 | Damnjanovic | 370/216 |
| 2009/0245195 A1* | 10/2009 | Bhattad et al. | 370/329 |
| 2009/0245331 A1* | 10/2009 | Palanki et al. | 375/148 |
| 2010/0128622 A1* | 5/2010 | Horiuchi et al. | 370/252 |
| 2010/0329134 A1* | 12/2010 | Doppler et al. | 370/252 |
| 2011/0038266 A1* | 2/2011 | Kim et al. | 370/242 |

OTHER PUBLICATIONS

Catt et al: "Consideration on the Non-Synchronized Random Access Procedure for EUTRA TDD"; 3GPP TSG RAN WG1 ##46, R1-062294, Tallinn, Estonia, Aug. 28-Sep. 1, 2006, 7 Page Document.

Nokia Corporation et al: "CQI Request"; 3GPP TSG-RAN WG2 #60, R2-074681, Jeju, South Korea, Nov. 5-9, 2007, 2 Page Document.

Lucent Technologies: "Uplink Scheduling Requests for Real Time Services"; 3GPP TSG-RAN WG2 #55, R2-062811, Seoul, Korea, Oct. 9-13, 2006, 6 Page Document.

* cited by examiner

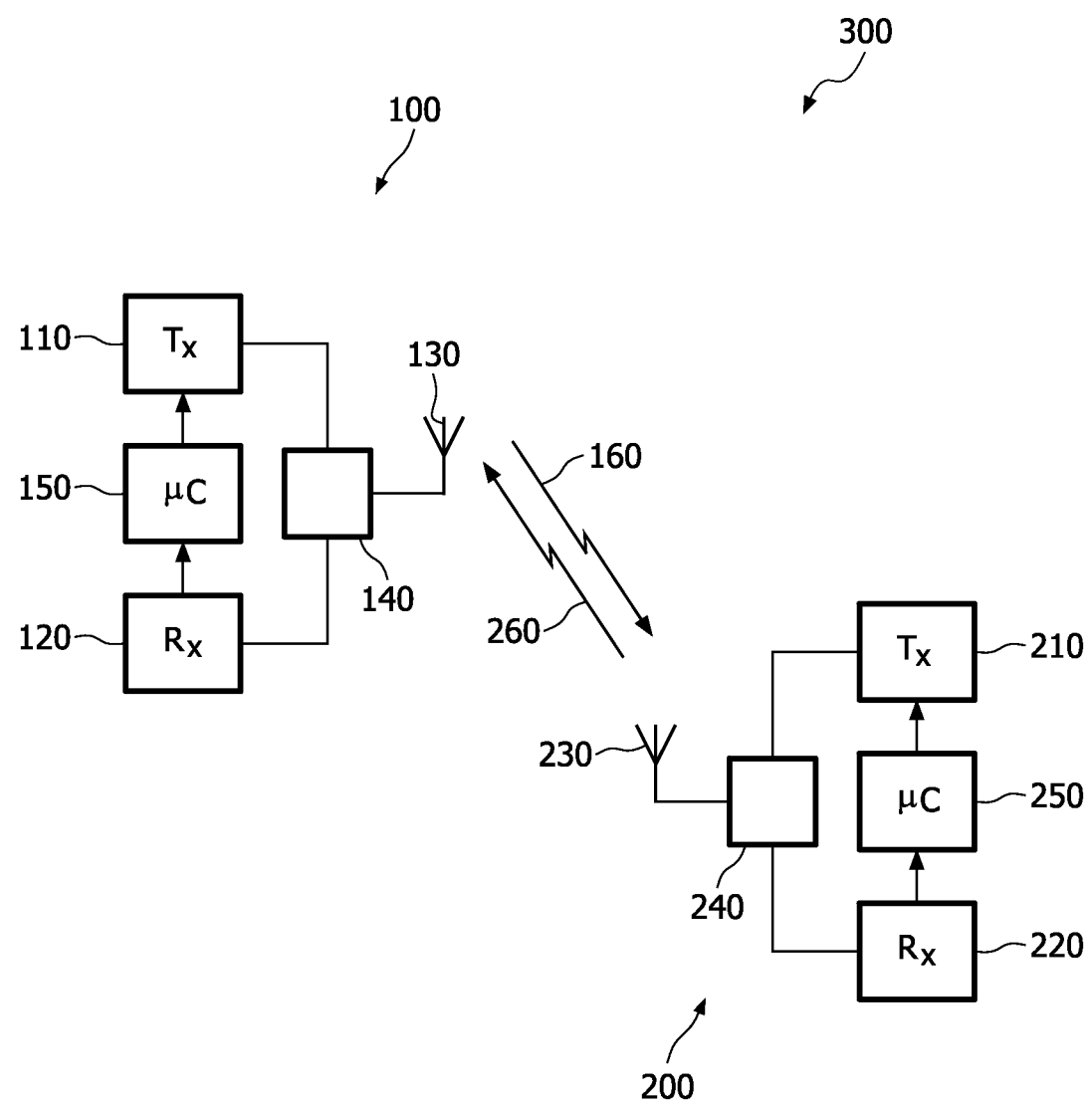

METHOD FOR COMMUNICATING IN A NETWORK AND RADIO STATIONS THEREFOR

FIELD OF THE INVENTION

The present invention relates to a method for communicating data through a network. More specifically, this invention relates to a method for communicating in a mobile telecommunication network, for example, a UMTS network.

BACKGROUND OF THE INVENTION

Many communication systems operate using a centralised scheduler which is responsible for allocating transmission resources to different nodes so that they are able to communicate with one another.

A typical example is the uplink of the UMTS LTE (Long Term Evolution), where the uplink transmissions from different secondary stations, also named User Equipments (UEs), are scheduled in time and frequency by the primary station of the cell, also named the evolved Node B (eNB). The primary station transmits a "scheduling grant" message to a secondary station, indicating a particular time-frequency resource for the secondary station's uplink transmission, typically around 3 ms after the transmission of the grant message. The grant message also typically specifies other transmission parameters, e.g. the data rate or power to be used for the secondary station's transmission.

In order for the primary station to issue appropriate grants, it needs to have sufficient information about the amount and type of data awaiting transmission in the buffer of each secondary station. The status of the secondary station's buffer is typically indicated by the secondary station to the primary station by means of a Buffer Status Report (BSR) procedure.

In addition the primary station sends messages to secondary stations indicating the resources being used for downlink transmissions. For efficient choice of transmission parameters such power, data rate and pre-coding dedicated to each secondary station, the primary station requires channel state information, typically comprising an indication of the SINR at the receiver or receivable data rate, and information on the transfer function and spatial characteristics of the channel. For the purpose of discussion this information can be considered as "CQI" or Channel Quality Information. CQI can be beneficial for selecting transmission parameters for ACK/NACK signals transmitted on the downlink in response to uplink packets, as well as for selecting transmission parameters for downlink data transmissions.

A problem with the BSR procedure above is that a secondary station is only permitted to transmit a BSR if it has a granted resource in which to transmit. One solution to this problem is for the secondary station to transmit a low overhead signal (an SR), which is followed by a grant of resources for a BSR. But this procedure may take some time.

Similarly, a secondary station can only transmit a CQI report if it has been granted resources. Currently in LTE these could be made available periodically, or on a one-off basis. The primary station can request a CQI report by setting a bit in a control channel message carried by the Physical Downlink Control Channel (PDCCH). The same message also grants uplink resource.

As a consequence, the granting of uplink resources specifically for BSR or CQI carries an overhead. If the resources are granted using a signalling message (e.g. on a control channel such as PDCCH), then there is an overhead due to the resources used in the downlink transmission of every signalling message.

SUMMARY OF THE INVENTION

It is an object of the invention to propose a method for communicating data in a more efficient manner.

Another object of the invention is to propose a method for transmitting the relevant information to the primary station when needed.

Still another object of the invention is to propose a method for providing to the primary station the required information without causing too much overhead.

To this end, in accordance with a first aspect of the invention, a method is proposed for communicating between a primary station and at least one secondary station, comprising the steps of
(a) at the primary station, requesting the secondary station to transmit channel quality information representative of the channel quality and,
(b) at the secondary station, responsive to the request of step (a), transmitting to the primary station the channel quality information, wherein step (b) comprises substep (b1) wherein the secondary station further transmits with the channel quality information an indication of a secondary station buffer status.

In accordance with a second aspect of the invention, a secondary station is proposed comprising receiving means for receiving from a primary station a request to transmit channel quality information representative of the channel quality, and transmitting means for transmitting to the primary station, responsive to the request, the channel quality information, the transmitting means being arranged for further transmitting with the channel quality information an indication of a secondary station buffer status.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein:

FIG. 1 is a block diagram of a system of communication in which the first aspect of the invention is implemented.

DETAILED DESCRIPTION OF THE INVENTION

The present invention relates to a system of communication 300 as depicted in FIG. 1, comprising a primary station 100, like a base station, and at least one secondary station 200 like a mobile station.

The radio system 300 may comprise a plurality of the primary stations 100 and/or a plurality of secondary stations 200. The primary station 100 comprises a transmitter means 110 and a receiving means 120. An output of the transmitter means 110 and an input of the receiving means 120 are coupled to an antenna 130 by a coupling means 140, which may be for example a circulator or a changeover switch. Coupled to the transmitter means 110 and receiving means 120 is a control means 150, which may be for example a processor. The secondary station 200 comprises a transmitter means 210 and a receiving means 220. An output of the transmitter means 210 and an input of the receiving means 220 are coupled to an antenna 230 by a coupling means 240, which may be for example a circulator or a changeover switch. Coupled to the transmitter means 210 and receiving means 220 is a control means 250, which may be for example a processor. Transmission from the primary radio station 100 to the secondary station 200 takes place on a first channel 160 and transmission from the secondary radio station 200 to the primary station 100 takes place on a second channel 260.

The present embodiment of this invention results from a recognition that some applications require intermittent resources for both uplink and downlink transmission and efficient transmission of both a buffer status report (BSR) or similar and channel quality information (CQI) is then required. In accordance with this embodiment of the invention, a common means for triggering uplink transmission of BSR and CQI is provided. Moreover, it is proposed that the BSR and CQI may be transmitted at the same time, in the same message or at least on the same channel.

This first embodiment of the invention thus permits the following:
  Only one trigger mechanism is required for both reports. If the common trigger is carried by a downlink control channel message this gives a saving in downlink overhead
  A single set of uplink transmission resources can carry both reports. This is likely to be more efficient than sending two separate reports. If the trigger is carried by a downlink control channel message, then this message can grant the resource for the uplink transmission of both reports.

In accordance with the first embodiment of the invention, a system using LTE is provided, where the primary station from time to time transmits data packets in the downlink and indicates their presence to the relevant secondary stations by means of a control messages like PDCCH messages. In addition the secondary stations from time to time transmit data packets in the uplink (after requesting resources and then being granted resources via PDCCH). In order to achieve efficient downlink transmission the primary station requests uplink CQI transmission when needed by setting a corresponding "CQI request bit" in the PDCCH message that is used to grant uplink resource. According to the invention the same "CQI request bit" also requests a report on the status of the secondary station's buffer, like a BSR. The resulting uplink transmission may carry user data as well as CQI and BSR.

In a variation of the preferred embodiment the "CQI request bit" is configured by higher layer signalling to indicate either a request for a CQI report alone or both CQI and BSR. In this case, when the primary station sends a request for CQI, and if the higher layer signaling indicated that the secondary station has to transmit its CQI accompanied with a BSR, the secondary station replies by incorporating a CQI and a BSR into a message to the primary station.

This solution does not cause overhead or too much signaling.

In a further variation of the first embodiment, the interpretation of the "CQI request bit", as indicating either a request for a CQI report alone or both CQI and BSR, depends on a condition being met, such as a subframe number being equal to one of set of particular values, or a retransmission sequence number being equal to one of a particular set of values. By doing this, a CQI is from time to time accompanied with a BSR, so that the primary station is regularly informed on whether the secondary station has something to transmit.

In a second embodiment of the invention, an additional "BSR request bit" is provided in the control channel to indicate a request for a BSR separately from the CQI request. This bit may be always present in the PDCCH message, or its presence may be indicated by higher layer signalling.

In a variant of the previous embodiments, the CQI may be of several types. The selected type of CQI report transmitted may depend on whether the CQI report is a scheduled one, or an additional one associated with a BSR. For example, if the CQI accompanying a BSR is primarily aimed at selection of suitable transmission parameters for ACK/NACK transmitted on the downlink, for instance in response to data packets sent by a secondary station, a wideband CQI report with limited resolution may be adequate. By contrast, CQI which is intended for downlink data transmission may more usefully provide multi-band channel quality information with higher resolution. The type of CQI report may therefore depend on the value to which the "BSR request bit" is set.

In some embodiments a BSR may be configured to be sent periodically. In this case a "BSR request" could have the effect of cancelling the next periodic BSR and the UE transmitting a BSR in the granted uplink resource.

In another variant of the previous embodiments, the "BSR request" may have the effect of changing the period of a configured periodic BSR. The value of the period could be toggled between two configured values, or a value selected using one or more bits.

In another embodiment the "BSR request" may have the effect of changing the configured size of a BSR. The value of the period could be toggled between two configured values, or a value selected using one or more bits.

These embodiments of this invention apply for example for communication systems utilizing centralised scheduling, such as UMTS and LTE.

Moreover, this also applies for mobile terminals for use in such systems.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single unit may fulfil the functions of several items recited in the claims. The mere fact that certain measures are recited in mutually different dependent claims does not indicate that a combination of these measured cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

Any reference signs in the claims should not be construed as limiting the scope.

The invention claimed is:

1. A method for communicating between a primary station and at least one secondary station, comprising the steps of
  (a) at the primary station, configuring by means of higher layer signaling the presence of an indication in a control channel message, wherein a particular value of said indication is a request for transmission by the secondary station of channel quality information representative of channel quality (CQI) and a buffer status report (BSR),
  (b) at the primary station, using said indication to request the secondary station to transmit said CQI and BSR and,
  (c) at the secondary station, responsive to receiving from the primary station the request of step (b), transmitting to the primary station in a single response message both the channel quality information (CQI) and the buffer status report (BSR) including an indication of an amount of data in a secondary station buffer.

2. The method of claim 1, wherein steps (b) and (c) are carried out if the simultaneous transmission of the channel quality information and the indication of the secondary station buffer status is enabled by a higher layer signaling.

3. The method of claim 1, wherein step (c) is carried out if at least one of the following conditions is met:
- a sub-frame number is equal to one of a set of particular values, or
- a retransmission sequence number is equal to one of a set of values.

4. The method of claim 1, wherein at step (c) the type of channel quality information is selected by the secondary station from a plurality of types of channel quality information depending on an estimated need of the primary station.

5. The method of claim 4, wherein the types of channel quality information comprise at least a wideband quality information, and at least one type of sub-band quality information.

6. The method of claim 5, wherein the wideband quality information is of a lower resolution than the at least one type of sub-band quality information.

7. The method of claim 5, wherein the secondary station selects between transmitting a sub-band quality information and a wideband quality information depending on whether said indication configured in step (a) indicates that the secondary station should transmit just the channel quality information (CQI) or both the channel quality information (CQI) and said BSR including an indication of an amount of data in a secondary station buffer status.

8. The method of claim 1, wherein the secondary station is configured to transmit periodically an indication of the buffer status, and wherein upon receiving the request of step (b), the secondary station modifies the period of transmission of indication of the buffer status.

9. The method of claim 1, wherein upon receiving the request of step (b), the secondary station transmits a buffer status report in the next possible sub frame.

10. A secondary station comprising;
- (a) receiving means for receiving from a primary station, via higher layer signaling, configuration of the presence of an indication in a control channel message, wherein a particular value of said indication is a request for transmission by the secondary station of channel quality information representative of channel quality (CQI) and a buffer status report (BSR), and
- (b) transmitting means for transmitting to the primary station, responsive to receiving from the primary station a request for transmission by the secondary station of (CQI) and (BSR) configured according to step (a), in a single response message, both the channel quality information (CQI) a buffer status report (BSR) including an indication of an amount of data in a secondary station buffer.

* * * * *